J. HOMAN.
GRAIN SHOCKING MACHINE.
APPLICATION FILED APR. 16, 1910.
1,016,628.
Patented Feb. 6, 1912.
6 SHEETS—SHEET 4.
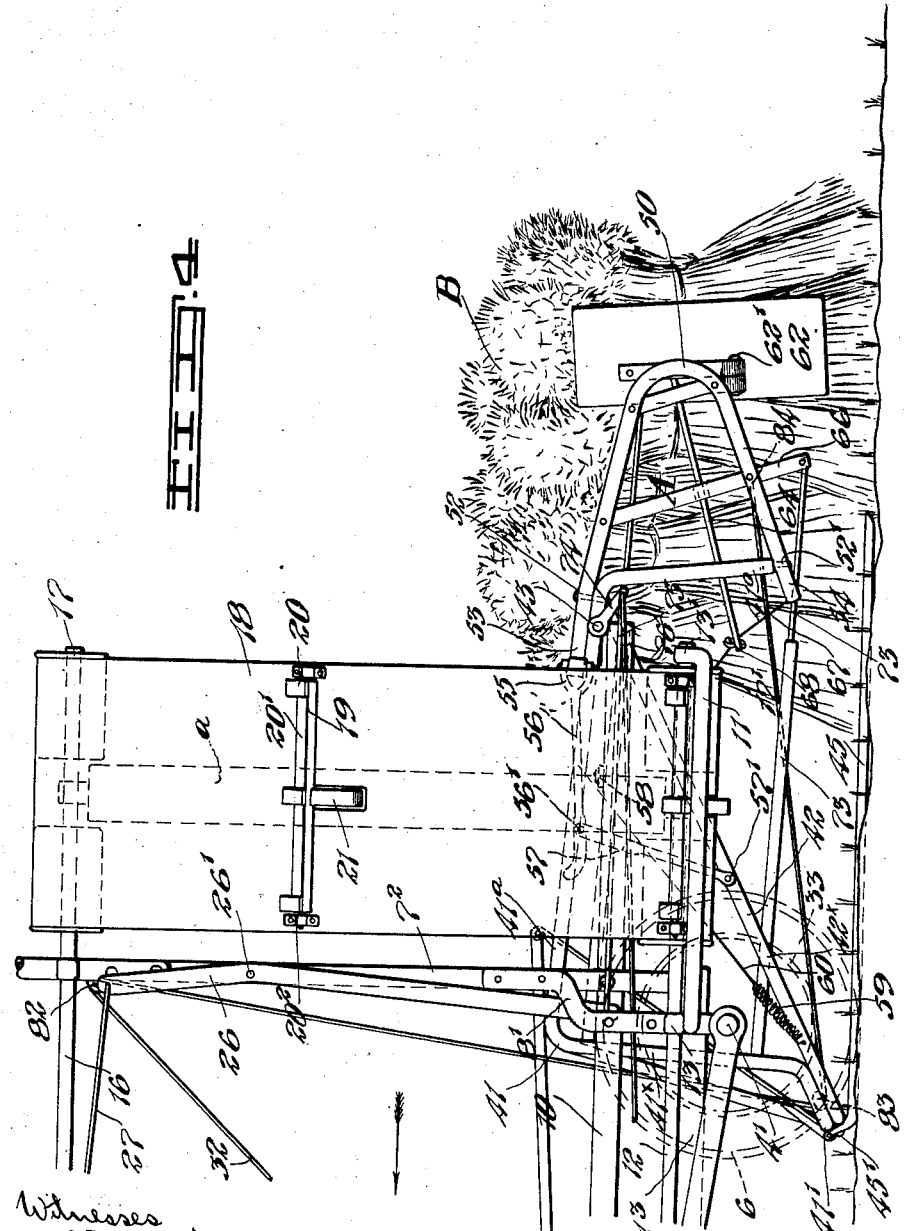

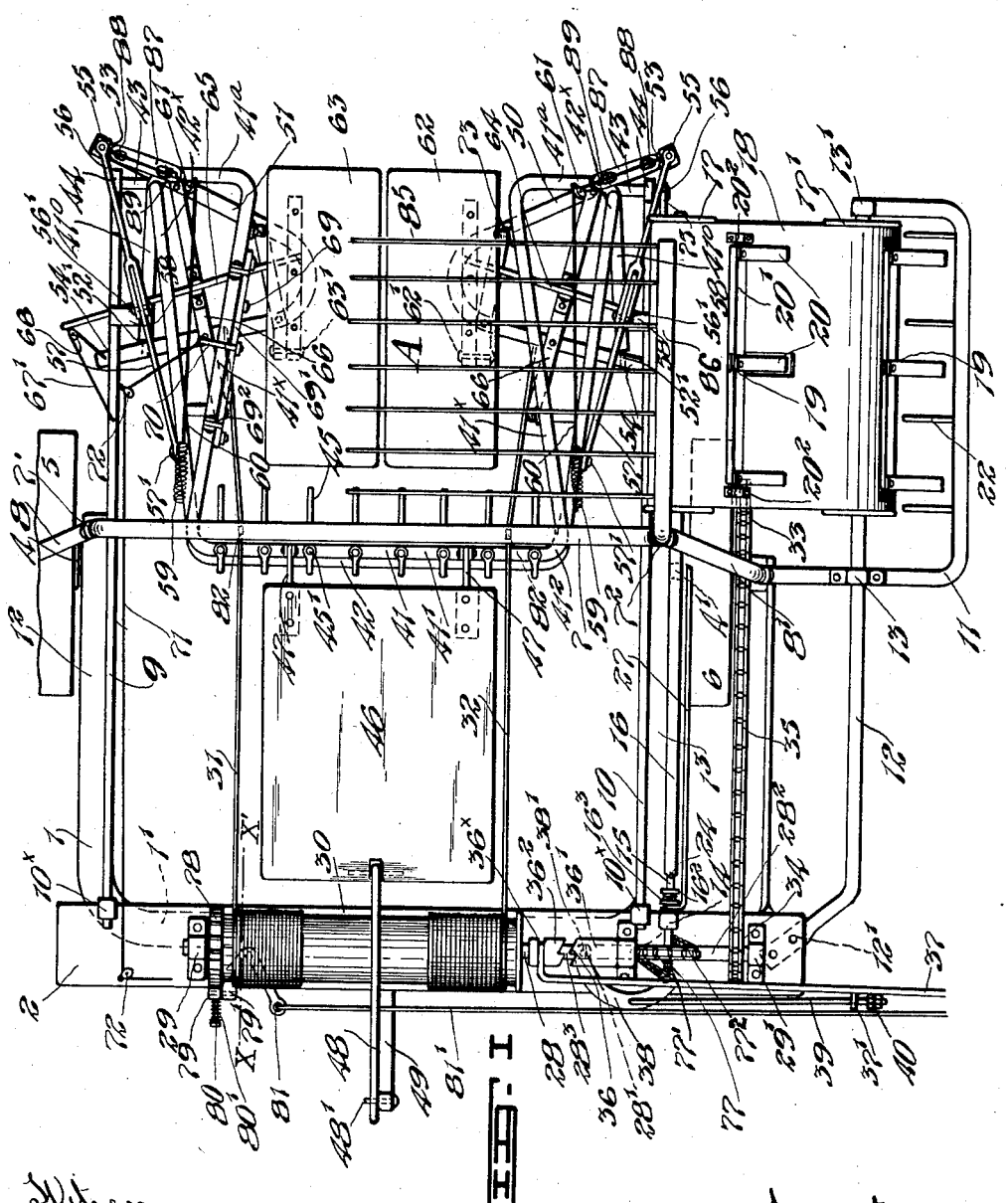

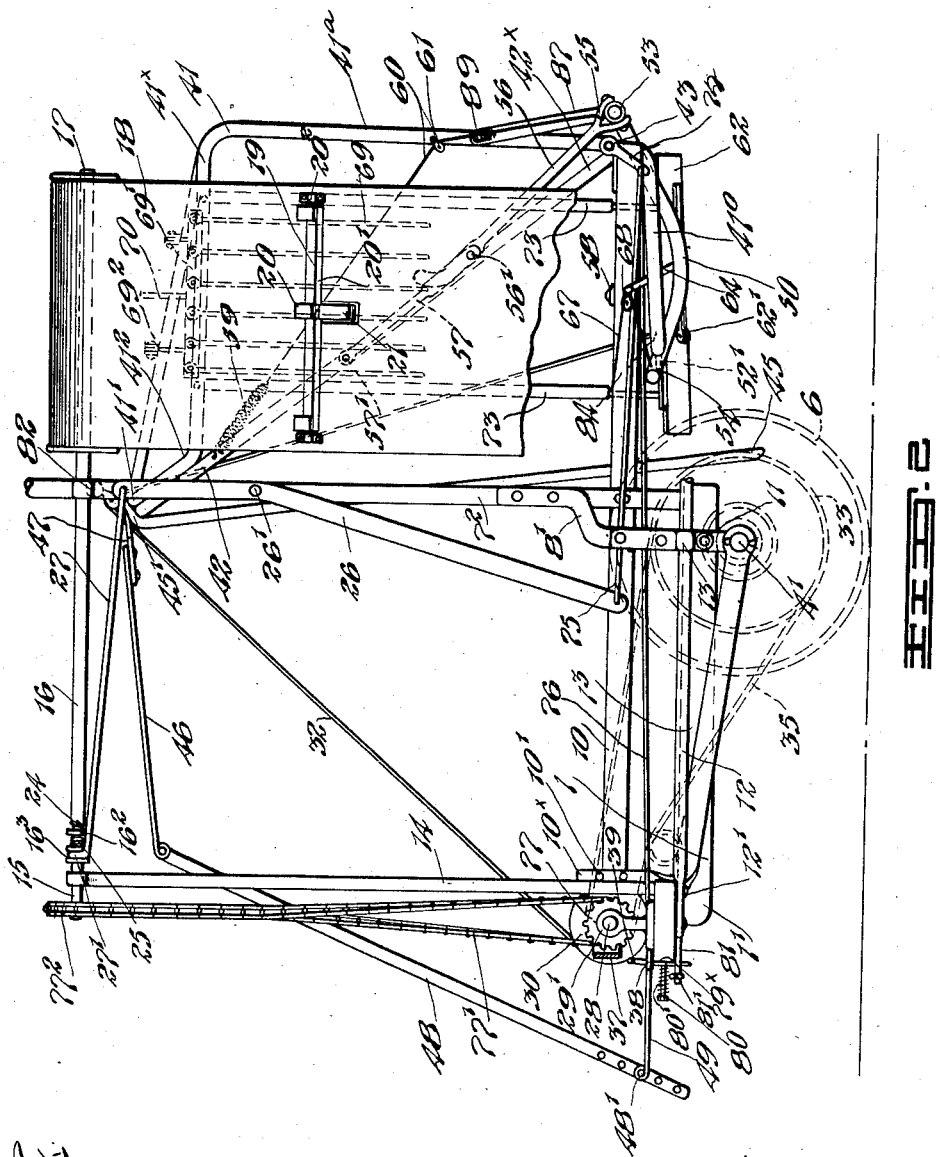

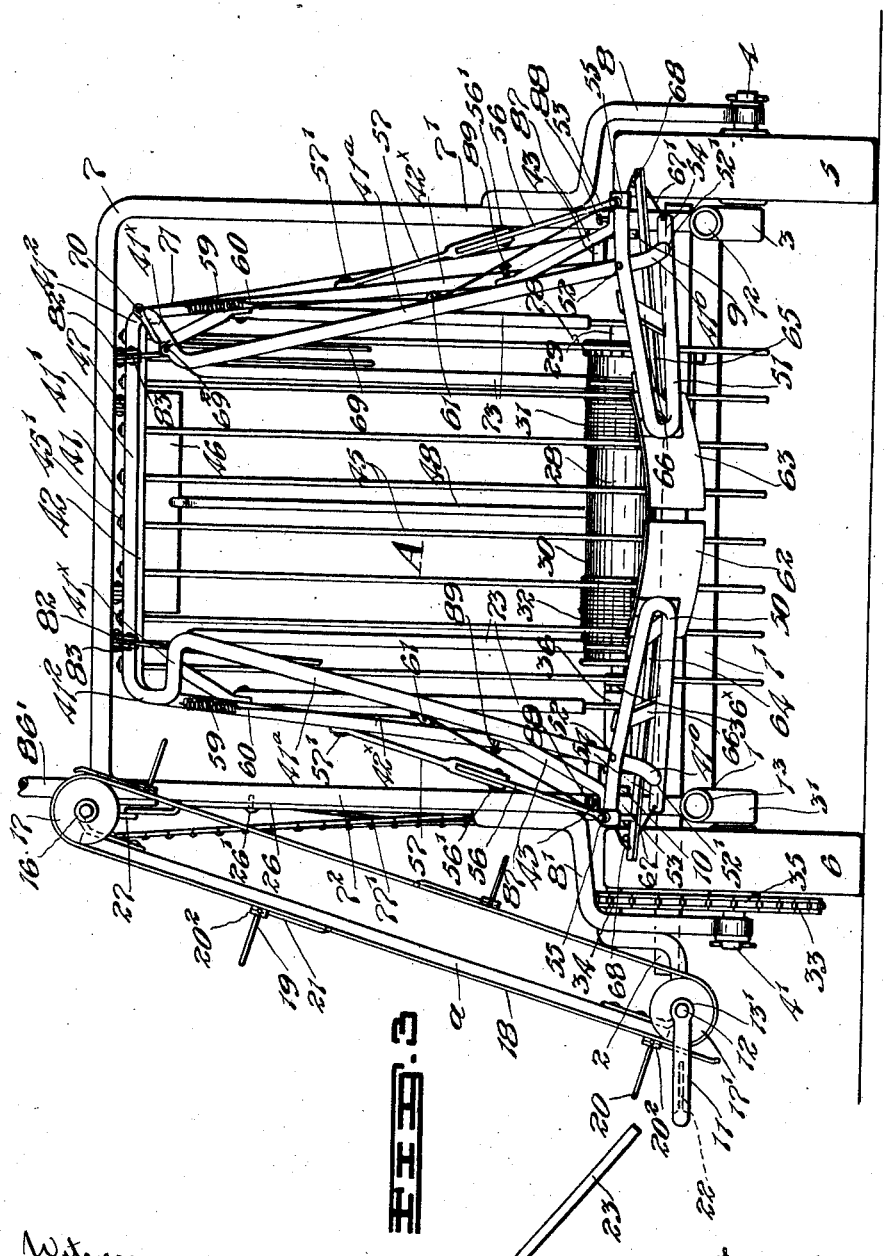

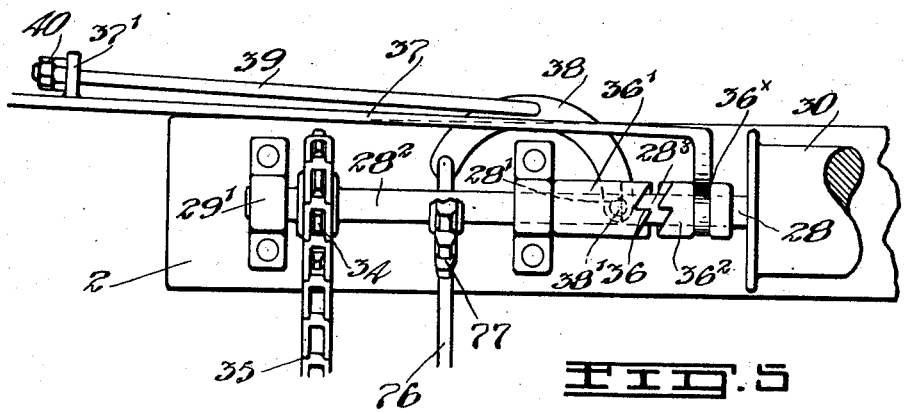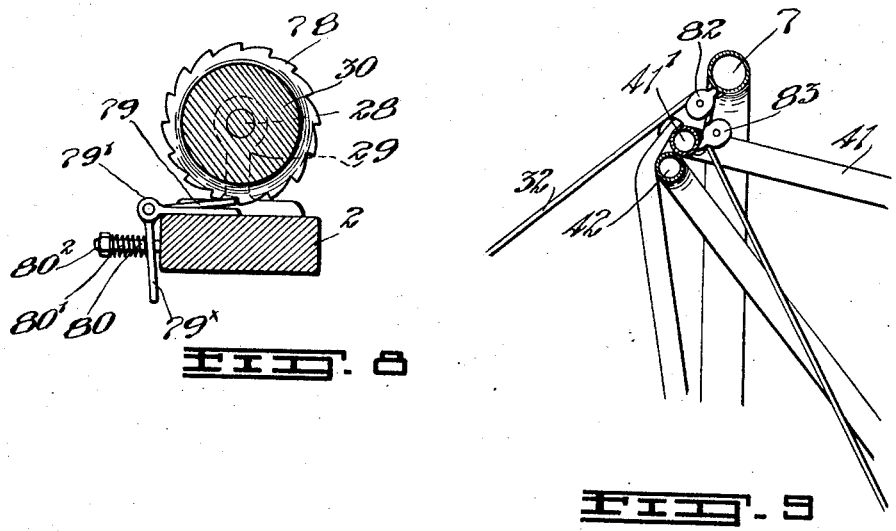

J. HOMAN.
GRAIN SHOCKING MACHINE.
APPLICATION FILED APR. 16, 1910.
1,016,628.
Patented Feb. 6, 1912.
6 SHEETS—SHEET 6.
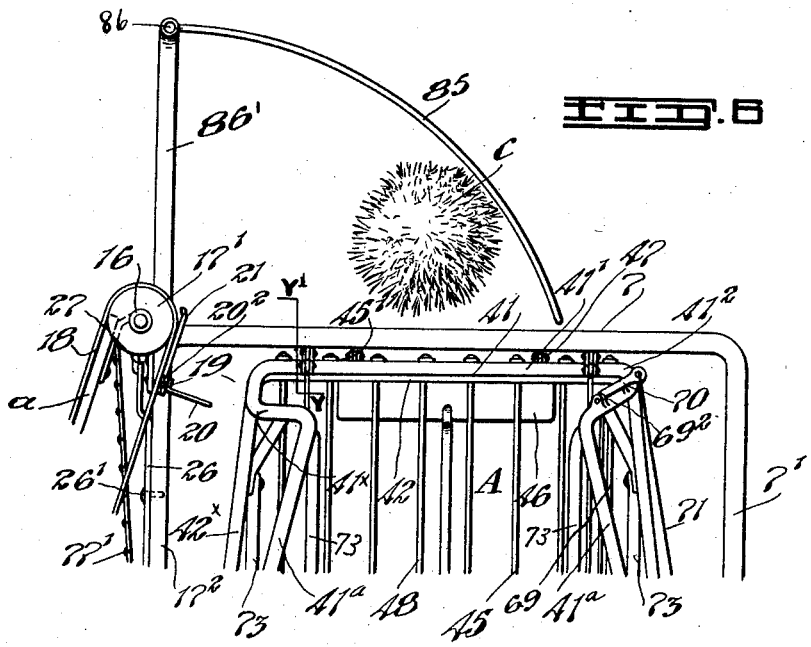
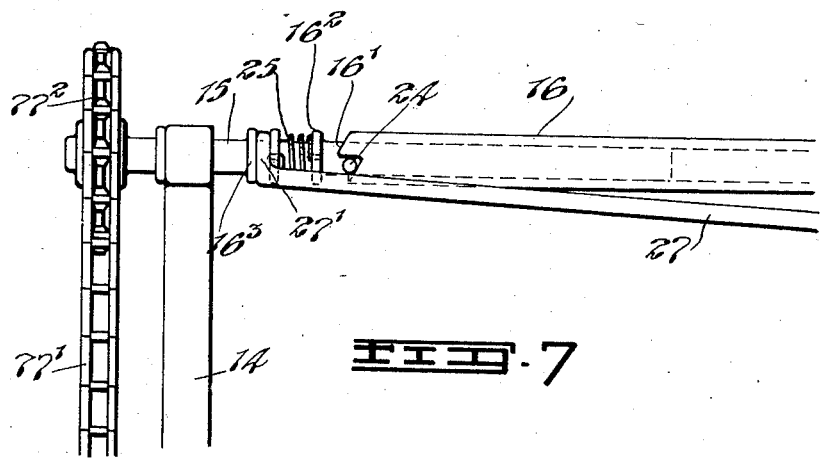

UNITED STATES PATENT OFFICE.

JAMES HOMAN, OF GRANDVIEW, MANITOBA, CANADA.

GRAIN-SHOCKING MACHINE.

1,016,628. Specification of Letters Patent. Patented Feb. 6, 1912.

Application filed April 16, 1910. Serial No. 555,781.

*To all whom it may concern:*

Be it known that I, JAMES HOMAN, residing at Grandview, county of Riding Mountain, in the Province of Manitoba, Canada, have invented certain new and useful Improvements in Grain-Shocking Machines, of which the following is the specification.

My invention relates to a shocking machine which is adapted to coöperate with the binding machine to form shocks, the machine being under the direct control of the operator from the binder.

The object of my invention is to provide an easily operated, simply constructed machine of the above class which will effectually receive the sheaves from the binder deck, elevate them and deliver them successively to a shock forming receptacle, and further which will deposit the shock so formed on the ground in an upright position, the deposited shock being spread so as not to be affected by weather conditions.

A further object of the invention is to provide in combination with a receptacle or basket a means which will follow up the shock when it is deposited so as to prevent the same from being upset forwardly.

The structure organization and operation of the invention are such that the attachment may be applied very readily to any ordinary binding machine and may be sold either with or independently thereof, the invention specifically residing in the features of construction arrangement and operation as will hereinafter be set forth reference being made to the accompanying drawings in which—

Figure 1 is a plan view of the complete machine, in the sheaf receiving position. Fig. 2 is a side elevation of the same, parts of the sheaf delivery conveyer being torn away to expose construction. Fig. 3 is an end view of the machine. Fig. 4 is a partial side elevation of the shocking machine showing the parts as they appear when depositing a shock. Fig. 5 is an enlarged detailed plan view of the drum clutch controlling mechanism. Fig. 6 is a detailed end elevation of a portion of the conveyer showing the forks which guide the sheaves to the basket or receptacle. Fig. 7 is an enlarged detailed side elevation of the conveyer clutch controlling mechanism. Fig. 8 is an enlarged detailed vertical sectional view through the drum and forward cross beam, the section being taken in the plane denoted by the line X X', Fig. 1. Fig. 9 is an enlarged detailed vertical sectional view through a portion of the yoke bar and the top of the basket, the section being taken in the plane denoted by the line Y Y', Fig. 6.

In the drawings like characters of reference indicate corresponding parts in each figure.

1 is the main frame of the shocking machine constituting substantially three sides of an open square. The intermediate part 1' carries a cross beam 2 upon which is mounted the drum and drum clutch mechanism. To the extremities $1^2$ and $1^3$ of the frame I have secured blocks 3 3' which receive the inner ends of stationary shafts 4 and 4' on which are rotatably mounted the combined carriage and traction wheels 5 and 6.

7 is a yoke-shaped bar having its extremities 7', $7^2$, respectively, secured permanently to the extremities $1^2$ and $1^3$ of the main frame so that the bar spans the frame passing through the carriage wheels.

8 8' are brackets secured firmly at their upper ends to the yoke bar and having their outer ends receiving and supporting the extending ends of the shafts 4 and 4'.

9 and 10 are adjustable basket supporting arms which are pivotally secured centrally to the downwardly extending extremities 7' $7^2$ of the yoke bar. The bars carry rearwardly the basket or receptacle A hereinafter more fully described and have their forward ends passing longitudinally under U-shaped straps $10^\times$ firmly secured at their lower ends to the beam 2. The straps have opposing openings formed therein which receive pins 10' which allow the bars to be adjusted so as to raise or lower the basket from the ground.

11 is a tubular bracket having its one end firmly secured to the bracket 8', said bracket 11 carrying a longitudinally extending rod 12 which is received within a bearing 13 located in the body portion thereof and has its extending end secured in the free end of the bracket at 13'. The rod is fastened firmly at 12' to one end of the beam 2.

14 is a vertically directed supporting bar carried by the beam 2 and having a bearing formed in its upper end for the reception of a rotatable shaft 15 which carries the conveyer clutch controlling mechanism shortly to be referred to. One end of the shaft is telescoped within a tubular shaft 16 which is rotatably mounted in a bearing carried by the yoke bar 7. Upon the rod 12 and the shaft 16 are mounted upper and lower rollers 17 17', the upper roller being keyed to the shaft and the lower one rotatable on the rod, such rollers being united by an inclined canvas belt 18 over which the sheaves are passed. Upon the belt I have placed sets of equi-spaced carriers 19 formed as follows: Arms 20 extending normally at right angles from the face of the canvas are secured to cross bars 20' which are pivotally mounted at their ends in bearings formed in lugs $20^2$ secured to the canvas.

21 are trip bars secured to the rear side of the bars 20' and extending downwardly at right angles therefrom said bars having their lower ends curved toward the conveyer, the canvas being cut away to allow the bars to engage with the rollers as the conveyer moves.

22 are fingers extending inwardly from the tubular bracket 11 to prevent the sheaves delivered to the conveyer from dropping to the ground.

It is to be understood that when the machine is in use the lower end of the conveyer is adjacent the deck 23 of the binder so that the sheaves passing over the deck are delivered to the conveyer.

The shaft 15 has pins 24 extending therefrom which are adapted to engage with teeth 16' formed at the end of the tubular shaft 16, and is further provided with a collar $16^2$ and a slidable flanged sleeve $16^3$ which is interposed between the pins and the upper end of the bar 14. A spiral spring 25 is located on the shaft between the sleeve and the collar and is fastened to both the collar and sleeve.

26 is a lever pivoted at 26' to the yoke bar and having its upper end secured to a link 27, the head 27' of which is closed around the sleeve $16^3$ between the flanges.

28 is the drum shaft mounted in suitable bearings 29 29' carried by the beam 2, and split at 28' into two portions $28^2$ and $28^3$.

30 is a drum keyed on the portion $28^3$ of the shaft and supplied with two ropes or cables 31 and 32, respectively, the purpose of which will be hereinafter more fully described.

33 is a drive gear wheel secured to the carriage wheel 6 and 34 is a gear wheel on the portion $28^2$ of the drum shaft, said gear wheels being connected by a gear chain 35 whereby the rotary motion of the carriage wheel is transmitted to the drum, provided the clutch now described is set.

36 represents the drum clutch which is formed from a member 36' permanently secured to the portion $28^2$ of the shaft, and a member $36^2$ feathered on the portion $28^3$ of the shaft, such members being formed with the usual engaging teeth.

37 is a link passing toward the binding machine where it is connected with a suitable lever appearing within convenient range of the operator of the binding machine. The link has an end bifurcated, fitted within a groove formed at $36^x$ in the member $36^2$ of the clutch.

38 is an arched lever pivotally secured at 38' to the beam 2 immediately beneath the clutch.

37' is a lug extending from the link 37 and provided with an opening which receives a link 39 having one end fastened to the arched lever 38 and its opposite end threaded and provided with adjustable locking nuts 40.

The frame of the basket A is formed from tubular members 41 and 42, the member 41 being fixed to stub shafts 43 mounted in suitable bearings 44 carried at the rear ends of the adjustable basket supporting bars 9 and 10. The member 41 has a portion 41' thereof passing horizontally, the ends being bent at $41^2$ and passing first in a horizontal direction at $41^x$ and then in a vertical direction at $41^a$, the latter vertically directed portions diverging downwardly and passing beneath the shafts 43 where the extremities are turned forwardly at 41° (in the receiving position of the basket) to form supports for the gates shortly to be described. The member 42 is substantially of a U-shaped form having the cross portion thereof fastened securely to the cross portion 41' of the member 41, the extremities $42^x$ of the member being fastened permanently to the member 41 adjacent the shafts 43.

45 are fingers secured to the cross portion 41' of the tube 41 by rivets or other suitable means 45'. The fingers extend downwardly and slightly rearwardly toward the ground when the basket is in the receiving position and must in no case be constructed so that the points or lower ends project into the ground when the basket is lowered as this would be disastrous to the machine.

46 is a plate hereinafter known as the follower plate which is adapted to prevent the shock from falling forwardly after it has been deposited. The plate is swung from the cross portion 41' of the member 41 by suitable hangers 47 and is connected pivotally to a link 48 which is adjustably secured by means of a pin 48' to an arm 49 extending from and permanently secured to the beam 2. Holes are formed in the lower end of the link 48 whereby the link can be adjusted.

50 and 51 are similar gates forming the bottom of the basket in the receiving position thereof. The gates are hingedly supported and hold up the sheaves received by the basket until such time as the basket is swung one-quarter turn and the shock is ready to be deposited on the ground at which time the gates automatically open freely and allow the shock to pass from the machine. Each gate is substantially of a V-form and has one arm fastened to the tubular member 41 pivotally at 52 and the other arm swiveled at 52' to the adjoining extremity 41° of the tubular member. Both of the gates have arms 53 and 54 passing beyond their pivotal points, the respective arms 53 being united through a universal joint 55 with a bar 56 which is pivotally secured at 56' to a further bar 57 pivoted at 57' to the tubular member 42. In this way the latter bars are united to form a knuckle joint.

The bars 9 and 10 of the machine are provided with inwardly extending trip bars 58 which are adapted to engage with the bars 56 and 57 at their pivotal point and break the knuckle joint at a predetermined instant.

59 are springs located at each side of the basket and having an end secured to the downwardly directed portion 42ˣ of the tubular member 42 and the opposite end connected to cords or cables 60 which pass downwardly through pulleys 61 located on the downwardly diverging portions 41ᵃ of the tubular member 41 from which they pass to the extending end of the arms 53 where they are fastened. The object of the spring is to open or swing the gates immediately the knuckle joints are broken by the trip bars 58.

62 and 63 are similar hinged plates hereinafter referred to as heading plates said plates being secured by pins 62', 63', respectively, to the gates and having their movement controlled by levers 64 and 65 pivotally secured centrally of their length to the cross members 66 which pass between the arms of the respective gates and reinforce them.

67 and 67' are cables or ropes secured at their respective ends to the adjustable bars 9 and 10 and to the ends of the arms 54 and passing through pulleys 68 located at the free ends of the levers 64. These latter parts are constructed and united so that the gates 62 and 63 are swung on their pivotal point gradually to throw the heads of the sheaves together prior to the shock being deposited on the ground. As the basket swings from the receiving to the depositing position the arms 54 pass away from the bars 9 and 10 so that the ropes 67 and 67' are gradually drawn taut with the result that the levers 64 and 65 are swung so as to turn the plates 62 and 63 to tighten on the head of the shock.

69 are dependent deflecting surfaces secured to a common cross bar 69' which is hingedly suspended from the upper parts of the tubular member 41 at 69² at the side of the basket which is away from the conveyer.

70 is an arm secured to the bar 69', and 71 is a rope or cable fastened to the extremity of the arm and passing downwardly through suitable pulleys 72 located on the arm 9 and the beam 2 whence it passes to the binder and within convenient range of the operator.

In order to build up the sheaves into a suitable form for a shock as they are being thrown into the basket from the conveyer I have supplied telescoping tubes 73 at either side of the basket which pass between the upper portion of the tubular member 41 and the gates, the larger or outer members of the tubes being fastened to the member 41 and the smaller or inner members to the gates. It is necessary that the tubes telescope in order to take up the fluctuations caused by the movement of the gates when the basket is turned.

74 is a lever firmly secured to the end of one of the shafts 43, and 75 is a rod uniting the latter lever with the lower end of the lever 26. 76 is a further rod uniting the lever 74 with the arched lever 38 already referred to.

The shaft 28 is supplied with a chain wheel 77 which is connected through a chain 77' with a second chain wheel 77² at the end of the shaft 15.

78 is a ratchet wheel permanently secured to one end of the drum and 79 is a ratchet dog engageable with the teeth of the ratchet wheel and carried pivotally by a bracket 79' secured to the beam 2. A pin 80 passes horizontally into the beam through a suitable slot formed in an arm 79ˣ which extends from the ratchet. A spring 80' encircles the pin and bears against the arm at one end and against an adjusting nut 80² carried by the pin.

81 is a bell crank pivotally secured to the under side of the beam 2 and having an end bearing against the arm 79ˣ, and the other end connected to a link 81' which passes to the binding machine and within suitable range of the operator.

The ropes or cables 31 and 32 hereinbefore referred to, after leaving the drum pass upwardly through pulleys 82 carried by the yoke bar 7 then through a further set of pulleys 83 secured to the portion 41' of the member 41 whence they are directed to the gates and finally fastened at 84. These ropes or cables are for the purpose of shutting the gates and raising the basket to the receiving position after the shock has been deposited.

In order to avoid any possibility of the sheaves carried by the conveyer being thrown outside of the basket I have provided the arched retaining fingers 85 which overhang the basket and are carried by a horizontally disposed arm 86 fastened to the yoke bar 7 by a bar 86'. If a sheaf happens to be thrown from the conveyer further than desired it engages with the retaining fingers 85 and is deflected into the basket.

I have shown in Fig. 4 of the drawing a shock B as it appears after it has been deposited and is leaving the shocker, the gates and plates being open or swung back.

If reference be made to Figs. 1, 2, and 3 of the drawing it will be seen that the weight of a shock when suspended within the basket is carried almost entirely by the gates, the gates being as far as the above description is concerned held closed by the bars 56 and 57. However there is every possibility of the knuckle joint buckling when the machine is passed over rough ground, which, if it happen, would be disastrous to the shock, as it would be prematurely deposited. In order to avoid any such possibility I have provided a set of compression tubes 87 which when the shock is in the basket are designed to take the weight off the knuckle joint and to prevent the gates from opening in event of the knuckle joint being buckled. These tubes have their ends slotted to allow of a reasonable amount of loose motion or play and have their lower ends fastened securely by pins 88 to the arms 53 of the gates and their upper ends by pins 89 to the downwardly diverging portions 41$^a$ of the member 41.

In order to better understand my invention I will now describe its operation assuming that the machine is attached to a binder and drawn forwardly, the conveyer being in a position where it will receive the sheaves C as they are delivered from the binder deck, and also that the basket is in the receiving position with the clutches set as in Fig. 1.

The sheaves delivered over the deck 23 fall onto the fingers 22 successively and are picked up by the arms 20 and elevated by the travel of the conveyer, it being understood that the conveyer is at this time operated by the chains 77' and 35, the conveyer clutch being set. It is here pointed out that the sheaves are caught or grasped tightly by the arms 20 owing to the turned end of the trip bar engaging with the under side of the lower roller. As the fingers pass upwardly the sheaf is held to the belt tightly by the trip bar engaging the board "a" located immediately beneath the ascending side of the conveyer and supported at its upper and lower ends by the shafts 16 and 12, it being noticed that the rollers are cut away in the center. When a sheaf reaches the top of the conveyer it is thrown into the basket and drops onto the gates, the butt of the sheaf being directed toward the forward end of the shocker, that is, to the end carrying the drum. The basket is filled by successive sheaves from the conveyer, a shock being thus formed. As the basket fills there is a gradual inclination for the sheaves to bank on the side away from the conveyer, but to overcome this difficulty I have provided the deflecting fingers 69 which can be swung by the operator to throw the sheaves to the opposite side of the basket as desired when they are thrown from the conveyer. As soon as the operator considers a sufficient number of sheaves have been placed in the basket he pulls on the link 81' which motion releases the ratchet from the ratchet wheel 78. This frees the drum and allows the ropes or cables to unwind, the weight of the shock turning the basket on its pivotal points and bringing the fingers 45 to substantially a horizontal position and directing the butts to the ground. Coincident with the swinging motion of the basket the rods 75 and 76 are drawn rearwardly by the lever 74, the rod 75 disengaging through the agency of the lever 26 and link 27, the conveyer clutch thereby stopping the conveyer, and the rod 76 turning the arched lever 38 so as to slide the link 39 in the lug 37' and passing the locking nuts 40 away from the lug. The heads of the sheaves are jammed together as the basket swings to the depositing position by the plate 46 and the plates 62 and 63, the link 48 throwing the then upper edge of the plate 46 gradually against the heads of the sheaves, and the cables or ropes 67 and 67' swinging the then upper edges of the plate 62 and 63 over against the heads of the sheaves at the opposite sides of the basket to the plate 46. It is to be understood in this connection that the latter ropes are drawn gradually taut as the basket swings, with the result that the links 64 and 65 throw the plates 62 and 63 against the shock. Just prior to the instant at which the basket is overturned or reaches its final position the knuckle joints formed in the bars 56 and 57 are broken by coming into engagement with the trip bars 58, so that the gates are freed to swing rearwardly with the shock as it passes from the machine. As the gates swing backwardly they release the ropes 67 and 67' thereby freeing the plates 62 and 63. I desire to gage the plate 46 so that it will follow the shock back for a short time after it has been deposited thereby preventing any possibility of the shock being upset forwardly as the machine progresses. When the shock has been finally deposited the operator draws on the link 37 thereby throwing the drum clutch and causing the cables 31 and 32 to be wound on the drum the ratchet at this time escaping over the teeth on the ratchet wheel, thereby returning the basket to its original receiving position, the gates being drawn shut and the basket being raised by the cables. As the basket swings to the receiving position the lever 74 is turned forwardly and in turning carries with it the rods 75 and 76. The rod 75 in passing forwardly throws in the conveyer clutch so that the sheaves delivered from the binder are again elevated and the rod 76 in passing forwardly throws out the drum clutch so that the drum is stopped rotating. The ratchet engages with the teeth of the ratchet wheel and prevents the weight of the basket from unwinding the cables from the drum.

The operation as above described is repeated each time it is desired to deposit a shock, the operator putting the basket into operation by actuating the link 81'.

What I claim as my invention is:—

1. In a shocking machine the combination with a main frame carried by suitable supporting wheels and having an open end, of a basket frame pivotally mounted at the open end of the main frame, similar gates pivotally secured to the basket frame and adapted to close the bottom thereof in the sheaf receiving position of the basket, sets of bars uniting the gates to the basket frame, knuckle joints in said bars whereby the gates are locked in the sheaf receiving position, means adapted to break the knuckle joints to release the gates when the basket is turned to the depositing position, fingers dependent from the basket frame and closing the forward sides thereof, means for automatically releasing the basket frame to swing the same about its pivot by gravity into shock delivering position and means adapted to raise the basket when the shock is delivered, as and for the purpose specified.

2. In a shocking machine the combination with a main frame carried by suitable supporting wheels and having an open end, of an open basket frame pivotally mounted in arms carried by the main frame and at the open end thereof, similar opposing V-shaped gates pivotally secured to the basket frame and adapted to close the bottom of the basket when in the sheaf receiving position, said gates having each a portion extending beyond their pivotal points, sets of bars uniting the latter extending portions to the basket frame, a knuckle joint in said bars adapted to lock the gates in the sheaf receiving position, means carried by the main frame engageable with the knuckle joints when the basket is passed to the shock depositing position, means for automatically releasing the basket frame to swing the same about its pivot by gravity into shock delivering position, and fingers dependent from the basket frame and closing the forward side thereof, as and for the purpose specified.

3. In a shocking machine the combination with a main frame carried by suitable supporting wheels and having an open end, of a basket frame formed from interconnected tubular members, such frame being pivotally carried by the main frame within its open end, similar opposing V-shaped gates pivotally secured to the bottom of the basket frame and having arms extending beyond their pivotal points, sets of connecting bars passing between the arms aforesaid and the basket frame, knuckle joints in said bars adapted to lock the gates in the closed position, means carried by the main frame adapted to engage with and break the knuckle joints when the basket is turned, dependent fingers secured to the basket frame and adapted to close the forward side thereof when the basket is in receiving position, means for automatically releasing the basket frame to swing the same about its pivot by gravity to shock delivering position, and means adapted to raise the basket to the receiving position and to close the gates when the basket is raised, as and for the purpose specified.

4. In a shocking machine the combination with a main frame carried by suitable supporting wheels and having an open end, of an open basket frame pivotally carried by the main frame at the open end thereof, similar opposing gates pivotally secured to the basket frame at the bottom thereof said gates having each an arm extending beyond its pivotal point, sets of bars connecting the arms aforesaid with the basket frame, knuckle joints in said bars adapted to retain the gates in their closed position, trip bars carried by the main frame and engageable with the knuckle joints when the basket is swung to the shock depositing position thereby releasing the gates to move backwardly with the shock, dependent fingers carried by the basket frame and closing the forward side thereof when the basket is in receiving position, means for automatically releasing the basket to swing the same about its pivot by gravity into the shock delivering position, and means designed to raise the basket and close the gates when the shock is delivered, and heading plates carried by the gates, as and for the purpose specified.

5. The combination with the main frame, of a sheaf receiving and shock forming basket carried by the main frame, releasable gates pivotally secured to the basket frame and adapted to close the open end thereof when in the receiving position, similar opposing heading plates pivotally secured to the gates, levers carried by the gates and connected to the heading plates, and means for actuating the levers to cause the plates to bear against the heads of the sheaves when the basket is turned to shock delivering position, as and for the purpose specified.

6. In a shocking machine the combination with the main frame, of a sheaf receiving and shock forming basket pivotally carried by the main frame, releasable gates pivotally secured to the basket frame and adapted to close the open end thereof when in the receiving position, similar opposing heading plates pivotally secured to the gates, levers pivotally secured centrally of their length to the gates and fastened at one end to the heading plates, and means actuating the opposite end of the lever to press the gates against the head of the shock when the basket is turned to the shock delivering position, as and for the purpose specified.

7. In a shocking machine the combination with the main frame, of a sheaf receiving and shock forming basket carried by the main frame, releasable gates pivotally secured to the basket frame and adapted to close the open end thereof when in the receiving position, similar opposing heading plates pivotally secured to the adjoining ends of the gates, levers pivotally secured to the gates centrally of their length and having an end fastened to the heading plates the free ends of the levers carrying suitable pulleys, and cables secured to the main frame and to the gates, said cables passing through the pulleys aforesaid and being adapted to press the heading plates against the head of the shock when the basket is turned to the shock depositing position, as and for the purpose specified.

8. In a shocking machine the combination with a pivotally mounted sheaf receiving and shock forming basket carried by a suitable frame and having releasable gates pivotally secured thereto and closing the bottom thereof, and an arm extending from each of the gates, of compression tubes passing between the extremities of the arms and the basket frame, said tubes having their ends slotted and being secured to the aforesaid portions by pins passing through the slots, as and for the purpose specified.

9. In a shocking machine the combination with the main frame having a yoke-shaped bar passing upwardly therefrom, of a pivotally mounted sheaf receiving and shock forming basket carried by the frame, releasable gates closing the bottom of the basket and adapted to open when the basket reaches the shock delivering position, a drum located on the frame and having cables extending therefrom, said cables passing through suitable pulleys carried by the yoke bar and by the basket, and being connected at their extremities to the gates whereby the gates are closed, means for rotating the drum to raise the basket to sheaf receiving position and to close the gates, means for supporting the basket in receiving position, and means for releasing the drum to allow the basket to swing about its pivot by gravity to shock delivering position, as and for the purpose specified.

10. In a shocking machine the combination with the main frame and a pivotally mounted sheaf receiving and shock forming basket adapted to swing about its pivot by gravity to the shock delivering position, and a yoke bar passing upwardly from the frame and located above the basket, and pulleys on the yoke bar, of a rotatable drum mounted on the main frame, basket supporting cables extending from the drum and passing through the pulleys to the basket, a clutch adapted when the members are engaged to rotate the drum and raise the basket to the receiving position, a lever secured firmly to one of the basket supporting shafts, an arched lever pivotally mounted on the main frame, a rod connecting the levers, means actuated by the movement of the arched lever for disengaging the members of the clutch when the basket is brought to the receiving position, a ratchet wheel secured to the drum, a spring pressed ratchet playing on the ratchet wheel, and means for withdrawing the ratchet from the wheel, as and for the purpose specified.

11. In a shocking machine the combination with the main frame and a pivotally mounted sheaf receiving and shock forming basket adapted to swing about its pivot by gravity to the shock delivering position, and a yoke bar passing upwardly from the frame and located above the basket, pulleys on said yoke bar, of a rotatable drum mounted on the main frame, basket supporting cables extending from the drum and passing through the pulleys to the basket, a clutch designed when the members thereof are engaged to rotate the drum and bring the basket to the receiving position, a lever extending from one of the basket supporting shafts, an arched lever pivotally mounted on the main frame and adjoining the clutch, a rod connecting the levers, an actuating link secured to one member of the clutch and adapted to slide the same into engagement with the other member, a lug extending from the face of the latter link and provided with a central opening, a link secured to the arched lever and passing through the opening in the lug, said link being provided with locking nuts at the free end, a ratchet wheel permanently secured to the drum, a spring pressed ratchet playing over the ratchet wheel, and a link adapted to raise the ratchet from the ratchet wheel, as and for the purpose specified.

12. In a shocking machine the combination with a main frame and a pivotally mounted sheaf receiving and shock forming basket carried by the frame, said basket having its upper end open when in the sheaf receiving position, and being designed to swing forwardly to deposit a shock on the ground, of a follower plate hingedly secured to the basket, an arm extending from the main frame, and a link connecting the arm with the plate, such parts being adapted to pass the plate into the opening aforesaid when the basket is swung to the shock delivering position, as and for the purpose specified.

13. In a shocking machine the combination with a main frame and a pivotally mounted sheaf receiving and shock forming basket carried by the frame, said basket having its upper end open when in the sheaf receiving position, and being designed to swing forwardly to deposit a shock on the ground, of a follower plate hingedly secured to the basket, an arm extending from the main frame, a link pivotally secured to the follower plate and adjustably to the arm, said plate being adapted to close the opening aforesaid in the basket when the basket is turned to the shock delivering position, and being further designed to press on the head of the shock when the basket is turned, as and for the purpose specified.

14. In a shocking machine the combination with the main frame, a sheaf receiving and shock forming basket carried by the frame and adapted to be swung to deliver the shock, and an endless conveyer adapted to deliver sheaves to the basket, shafts for the conveyer, one of said shafts being tubular, of a rotatable shaft slidingly mounted in a bearing extending from the main frame, one end of the shaft being telescoped in the tubular shaft, a pin passing through the rotatable shaft, teeth formed at the adjoining end of the tubular shaft, with which the pin engages, a stationary collar on the shaft, a slidable flange sleeved on the shaft between the bearing and the collar, a spring interposed between the sleeve and collar, a lever pivotally carried by the frame, a link secured to the lever and to the sleeve, a lever turnable with the basket, and a rod connecting the latter lever with the lower end of the first mentioned lever, as and for the purpose specified.

Signed at Winnipeg, in the Province of Manitoba, this 9th day of March 1910.

JAMES HOMAN.

In the presence of—
G. S. ROXBURGH,
J. K. ELKIN.

---

Copies of this patent may be obtained for five cents each, by addressing the "Commissioner of Patents, Washington, D. C."